(12) United States Patent
Hattori et al.

(10) Patent No.: US 12,326,145 B2
(45) Date of Patent: Jun. 10, 2025

(54) CONTROL DEVICE, ELECTRIC COMPRESSOR, CONTROL METHOD, AND PROGRAM

(71) Applicant: MITSUBISHI HEAVY INDUSTRIES THERMAL SYSTEMS, LTD., Tokyo (JP)

(72) Inventors: Makoto Hattori, Tokyo (JP); Toyohisa Kawashima, Tokyo (JP); Kyohei Watanabe, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 6 days.

(21) Appl. No.: 17/768,169

(22) PCT Filed: Oct. 19, 2020

(86) PCT No.: PCT/JP2020/039217
§ 371 (c)(1),
(2) Date: Apr. 11, 2022

(87) PCT Pub. No.: WO2021/079841
PCT Pub. Date: Apr. 29, 2021

(65) Prior Publication Data
US 2024/0102465 A1  Mar. 28, 2024

(30) Foreign Application Priority Data
Oct. 24, 2019  (JP) .................................. 2019-193694

(51) Int. Cl.
*F04B 49/06* (2006.01)
*F04B 49/02* (2006.01)
(Continued)

(52) U.S. Cl.
CPC .............. *F04B 49/06* (2013.01); *F04B 49/02* (2013.01); *F04B 49/10* (2013.01); *H02P 23/04* (2013.01)

(58) Field of Classification Search
CPC .......... F04B 49/06; F04B 49/02; F04B 49/10; F04B 35/04; F04B 39/00; F04B 49/20; H02P 23/04; H02P 29/00
See application file for complete search history.

(56) References Cited

U.S. PATENT DOCUMENTS

2004/0066200 A1\*  4/2004  Fujioka ................ G01R 31/343
                                                          324/522
2014/0001993 A1   1/2014  Iwata et al.
(Continued)

FOREIGN PATENT DOCUMENTS

CN        107246382 A       10/2017
JP        H10285990    *    10/1998
(Continued)

OTHER PUBLICATIONS

Raw Machine Translation of JPH10285990; Kawakubo et al.,"Motor Controller and Compressor"; Oct. 23, 1998 (Year: 1998).\*
(Continued)

*Primary Examiner* — Charles G Freay
*Assistant Examiner* — Lilya Pekarskaya
(74) *Attorney, Agent, or Firm* — BIRCH, STEWART, KOLASCH & BIRCH, LLP

(57) ABSTRACT

Provided is a method for continuing the operation of an electric compressor even if the magnitude of ripple voltage exceeds a predetermined threshold value. A control device of an electric compressor is provided with: a detection unit for detecting the ripple voltage of the electric compressor which is driven by a battery; a determination unit for determining whether or not the value of the ripple voltage is
(Continued)

greater than or equal to a predetermined threshold value; and a control unit for reducing the rotation speed of a motor of the electric compressor down to a predetermined first target rotation speed greater than 0 when the value is greater than or equal to the threshold value.

12 Claims, 6 Drawing Sheets

(51) Int. Cl.
    *F04B 49/10*      (2006.01)
    *H02P 23/04*      (2006.01)

(56) References Cited

U.S. PATENT DOCUMENTS

| | | | |
|---|---|---|---|
| 2014/0340012 A1* | 11/2014 | Aiba | B60L 50/51 |
| | | | 318/400.15 |
| 2015/0365040 A1* | 12/2015 | Saha | H02P 27/06 |
| | | | 318/400.25 |
| 2016/0056744 A1* | 2/2016 | Khan | H02P 29/50 |
| | | | 318/139 |
| 2016/0380575 A1* | 12/2016 | Tsumura | H02P 6/14 |
| | | | 318/478 |
| 2017/0040925 A1* | 2/2017 | Sakai | H02P 29/0241 |
| 2017/0284409 A1 | 10/2017 | Kawashima et al. | |

FOREIGN PATENT DOCUMENTS

| | | |
|---|---|---|
| JP | 11-69882 A | 3/1999 |
| JP | 2002-325475 A | 11/2002 |
| JP | 2004-135393 A | 4/2004 |
| JP | 2007-259629 A | 10/2007 |
| JP | 4258905 B2 | 4/2009 |
| JP | 2013-66299 A | 4/2013 |
| JP | 2013-207925 A | 10/2013 |
| JP | 2013-219985 A | 10/2013 |
| JP | 2016-52203 A | 4/2016 |
| JP | 2016-77150 A | 5/2016 |
| JP | 2017-180211 A | 10/2017 |
| WO | WO 2014/157629 A1 | 10/2014 |
| WO | WO 2015/140867 A1 | 9/2015 |

OTHER PUBLICATIONS

International Search Report for International Application No. PCT/JP2020/039217, dated Dec. 22, 2020, with an English translation.
Written Opinion of the International Searching Authority for International Application No. PCT/JP2020/039217, dated Dec. 22, 2020, with an English translation.

* cited by examiner

CONTROL DEVICE, ELECTRIC COMPRESSOR, CONTROL METHOD, AND PROGRAM

TECHNICAL FIELD

The present disclosure relates to a control device, an electric compressor, a control method, and a program.

The present application claims priority based on Japanese Patent Application No. 2019-193694 filed in Japan on Oct. 24, 2019, the contents of which are incorporated herein by reference.

BACKGROUND ART

An electric compressor is one of the components of a car air conditioner mounted on a vehicle. In a drive circuit that drives the electric compressor, a ripple voltage that vibrates at a predetermined cycle is generated. When the ripple voltage becomes large, resonance occurs and an excessive current flows.

PTL 1 discloses a technique for detecting a ripple voltage of an alternator for a vehicle and determining that the alternator is out of order when a difference between the maximum value and the minimum value of the ripple voltage exceeds a predetermined value.

CITATION LIST

Patent Literature

[PTL 1] Japanese Unexamined Patent Application Publication No. 2004-135393.

SUMMARY OF INVENTION

Technical Problem

In order to protect the equipment from the excessive current due to the resonance of the ripple voltage, it is conceivable to control the motor of the electric compressor to be stopped. However, when the motor of the electric compressor is stopped, the operation of the car air conditioner is stopped, and user comfort is impaired.

The present disclosure provides a control device, an electric compressor, a control method, and a program capable of solving the above-described problems.

Solution to Problem

A control device of the present disclosure includes a detection unit that detects a ripple voltage of an electric compressor which is driven by a battery; a determination unit that determines whether or not a value of the ripple voltage is equal to or higher than a predetermined threshold value; and a control unit that reduces a rotation speed of a motor of the electric compressor to a predetermined first target rotation speed higher than 0 when the value is equal to or higher than the threshold value.

The electric compressor of the present disclosure includes the above-described control device.

A control method of the present disclosure includes detecting a ripple voltage of an electric compressor which is driven by a battery; determining whether or not a value of the ripple voltage is equal to or higher than a predetermined threshold value; and reducing a rotation speed of a motor of the electric compressor to a predetermined first target rotation speed higher than 0, when the value is equal to or higher than the threshold value.

A program of the present disclosure causes a computer to function as: means for detecting a ripple voltage of an electric compressor which is driven by a battery; means for determining whether or not a value of the ripple voltage is equal to or higher than a predetermined threshold value; and means for reducing the rotation speed of the motor of the electric compressor to a predetermined first target rotation speed larger than 0 when the value is equal to or higher than the threshold value.

Advantageous Effects of Invention

According to the above-described control device, electric compressor, control method, and program, the operation of the electric compressor can be continued while avoiding resonance due to ripple.

DESCRIPTION OF EMBODIMENTS

<Embodiment>

Hereinafter, an electric compressor according to an embodiment will be described with reference to FIGS. 1 to 6.

(Configuration)

Figure 1:
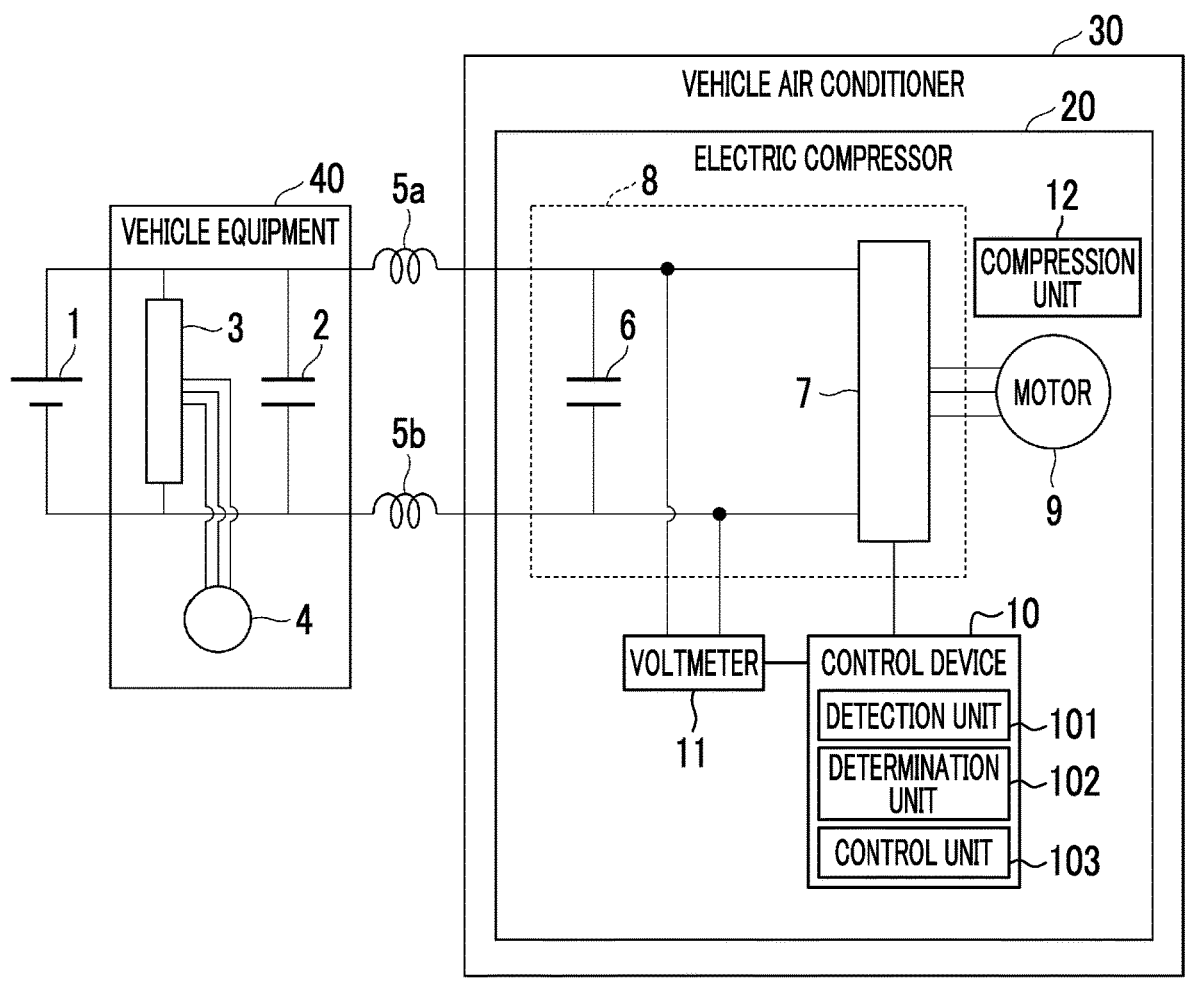
FIG. 1 is a diagram showing an example of an electric compressor in an embodiment.

FIG. 1 shows an example of a schematic configuration of an electric compressor 20 included in a vehicle air conditioner 30. A battery 1, the vehicle air conditioner 30, vehicle equipment 40, and an electric circuit for driving the battery 1, the vehicle air conditioner 30, and the vehicle equipment 40, illustrated, are mounted on the vehicle. Inductors 5a and 5b indicate the inductor components of the electric circuit including the battery 1, the vehicle air conditioner 30, and the vehicle equipment 40.

The battery 1 is a power supply unit mounted on a vehicle (outside the vehicle air conditioner 30). The battery 1 supplies high-voltage DC power to the vehicle air conditioner 30 and the vehicle equipment 40. The vehicle equipment 40 includes a capacitor 2, an inverter 3, and a load 4 connected to the inverter 3. The vehicle air conditioner 30 includes the electric compressor 20. The electric compressor 20 is an inverter-integrated electric compressor in which the inverter 7 is integrally incorporated. The electric compressor 20 includes a power supply circuit 8 including a capacitor 6 and an inverter 7, a motor 9, a control device 10, a voltmeter 11, and a compression unit 12. The electric compressor 20 is driven by the inverter 7 converting the high-voltage DC power supplied from the battery 1 into three-phase AC power and applying the three-phase AC power to the motor 9. The inverter 7 and the motor 9 are connected by a power line. The inverter 7 converts the DC power supplied from the battery 1 into three-phase AC power and supplies the three-phase AC power to the motor 9. The inverter 7 is controlled by the control device 10. The control device 10 includes a microcomputer, and controls the motor 9 to execute a desired operation via the inverter 7, based on a control signal acquired from an Electric Control Unit (ECU) or the like (not shown). For example, the control device 10 controls the rotation speed of the motor 9. When the motor 9 is rotationally driven according to the instruction from the inverter 7, the compression unit 12 compresses the refrigerant and supplies the refrigerant to the refrigerant circuit (not shown) included in the vehicle air conditioner 30. The inverter 7, the voltmeter 11, and the control device 10 are connected by a signal line. The voltmeter 11 detects the DC voltage input to the inverter 7 and outputs the detected voltage value to the control device 10. The voltage value measured by the voltmeter 11 includes a ripple component. The value obtained by subtracting the DC voltage value derived from the battery 1 from the voltage value measured by the voltmeter 11 is called a ripple voltage. When the ripple voltage becomes large, resonance occurs in the resonance circuit formed by the capacitors 2 and 6 and the inductors 5a and 5b, and an excessive current flows in the electric circuit including the vehicle air conditioner 30 and the vehicle equipment 40. Therefore, the control device 10 monitors the fluctuation of the voltage value measured by the voltmeter 11, and when the value W of the ripple voltage becomes equal to higher than a predetermined threshold value, performs control to decelerate the motor 9 and reduce the ripple voltage.

The control device 10 includes a detection unit 101, a determination unit 102, and a control unit 103.

The detection unit 101 acquires the voltage value measured by the voltmeter 11. The detection unit 101 detects the difference between the maximum value and the minimum value of the acquired voltage value in a predetermined minute time. This value is called the value W of the ripple voltage. The detection unit 101 detects the value W of the ripple voltage every minute time. The frequency of the ripple voltage to be detected by the detection unit 101 is equal to the carrier frequency of the inverter 7 and is constant.

The determination unit 102 compares the value W of the ripple voltage calculated by the detection unit 101 with a predetermined threshold value. When the value W of the ripple voltage is equal to or higher than the threshold value, the determination unit 102 determines to perform resonance protection control. The resonance protection control is a control that reduces the rotation speed of the motor 9 to reduce the value W of the ripple voltage to less than the threshold value.

The control unit 103 indicates the rotation speed of the motor 9 to the inverter 7. When the determination unit 102 determines to perform resonance protection control, the control unit 103 reduces the rotation speed of the motor 9 to a predetermined target rotation speed. Here, when the motor 9 is stopped, the occurrence of resonance can be prevented, but user comfort is impaired. Therefore, the control unit 103 performs control such that the operation of the motor 9 can be continued as much as possible while preventing the occurrence of resonance.

(Control to Reduce the Rotation Speed of the Motor)

Next, the resonance protection control of the present embodiment will be described with reference to FIGS. 2 to 4.

Figure 2:
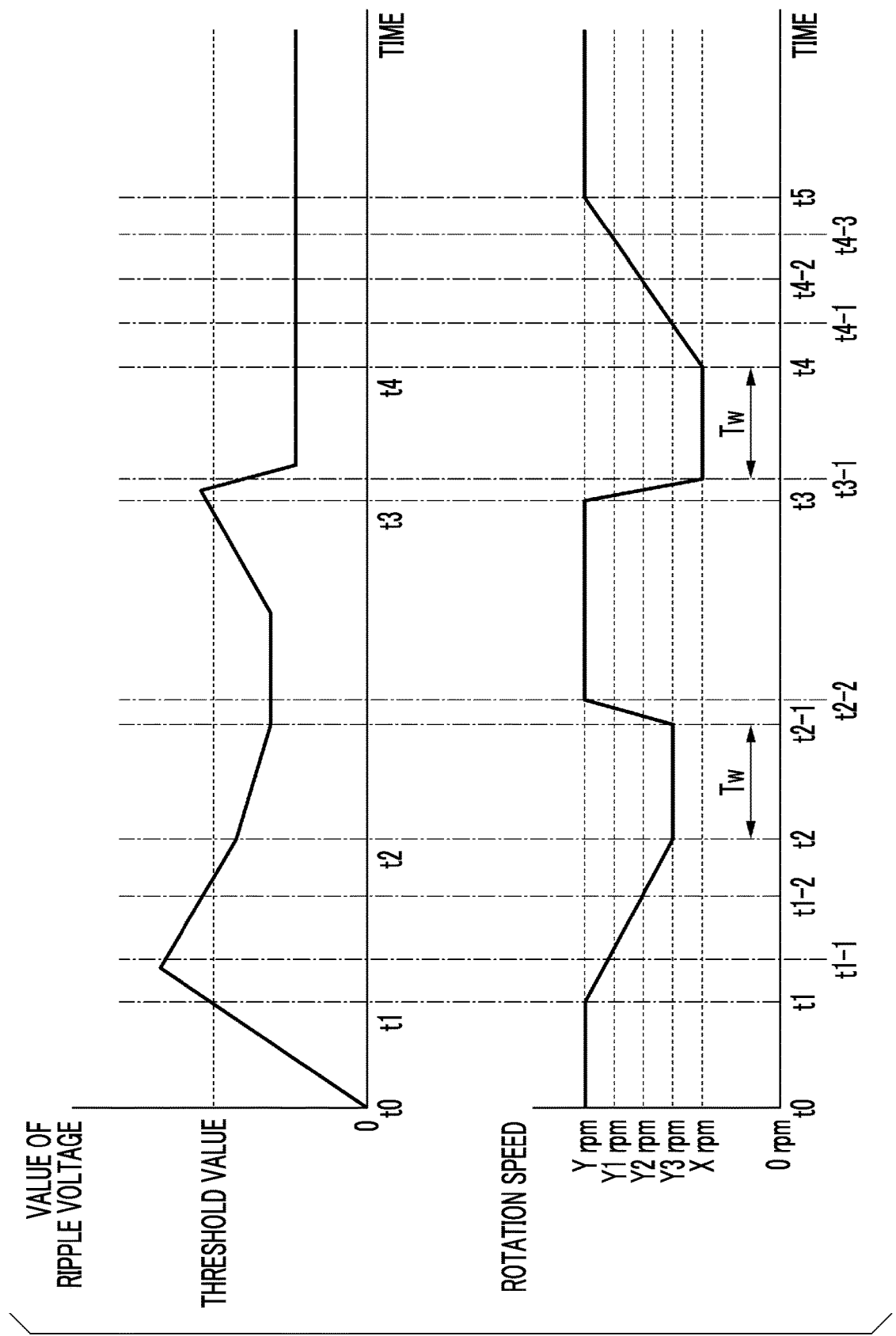
FIG. 2 is a first diagram illustrating resonance protection control in the embodiment.

FIG. 2 is a first diagram illustrating resonance protection control in the embodiment.

The vertical axis in the upper figure of FIG. 2 shows the value W of the ripple voltage, and the horizontal axis shows the time. The vertical axis in the lower figure of FIG. 2 shows the rotation speed of the motor 9, and the horizontal axis shows the time. The same position on the horizontal axes in the upper figure of FIG. 2 and the lower figure of FIG. 2 indicates the same time. X (rpm) in the lower figure of FIG. 2 is the minimum rotation speed of the motor 9. As will be described later, when the value W becomes equal to or higher than the threshold value even if the rotation speed of the motor 9 is reduced to the minimum rotation speed X (rpm), the control unit 103 stops the motor 9. These are the same in FIGS. 3 and 4.

(Time t0)

With reference to the upper figure of FIG. 2, the value W of the ripple voltage at time t0 is 0. With reference to the lower figure of FIG. 2, the rotation speed of the motor 9 at time t0 is Y (rpm). Y (rpm) is a rotation speed determined by the ECU of the vehicle based on the set temperature of the heating and cooling set by the user.

(Time t1)

When time t1 is reached, the value W of the ripple voltage becomes equal to or higher than the threshold value. The determination unit 102 instructs the control unit 103 to start the resonance protection control, based on the fact that the value W becomes equal to or higher than the threshold value. Then, the control unit 103 sets Y1 (rpm), which is a value smaller than Y, as the target rotation speed, and indicates the rotation speed Y1 to the inverter 7. When instruction of the rotation speed Y1 at time t1 is given, the rotation speed of the motor 9 gradually decreases and becomes Y1 (rpm) at time t1-1. When the rotation speed of the motor 9 becomes Y1 (rpm), the determination unit 102 again determines whether or not the value W is equal to or higher than the threshold value. In the illustrated example, the value W at time t1-1 is still equal to or higher than the threshold value. Therefore, the determination unit 102 instructs the control unit 103 to further reduce the rotation speed. The control unit 103 sets the rotation speed Y2 (rpm) (Y2<Y1) to the target rotation speed, and indicates the rotation speed Y2 to the inverter 7. The rotation speed of the motor 9 gradually decreases to Y2 (rpm) at time t1-2. The determination unit 102 compares the value W with the threshold value again, and instructs the control unit 103 to reduce the rotation speed, based on the fact of the value W of the ripple voltage threshold value. The control unit 103 indicates the rotation speed Y3 (rpm) (Y3<Y2) to the inverter 7.

(Time t2)

By the above control, at time t2, the rotation speed of the motor 9 becomes Y3 (rpm), and the value W of the ripple voltage becomes less than the threshold value. When the value W becomes less than the threshold value, the determination unit 102 instructs the control unit 103 to cancel the resonance protection control. The control unit 103 maintains the rotation speed of the motor 9 for a predetermined time. The reason why the rotation speed of the motor 9 is maintained for a predetermined time is to wait for the transient factor that increases the value W of the ripple voltage to disappear. When a predetermined time Tw elapses, at time t2-1, the control unit 103 indicates the rotation speed Y required by the load to the inverter 7. Thus, the operation of the vehicle air conditioner 30 returns to the operating state according to the load before the start of the resonance protection control (time t2-2). Even after this, the detection unit 101 continues to detect the ripple voltage, and the determination unit 102 determines whether or not the value W of the ripple voltage is equal to or higher than the threshold value in a predetermined control cycle. When the value W does not become equal to or higher than the threshold value, the vehicle air conditioner 30 continues the operating state according to the load.
(Time t3)

When the value W becomes again equal to or higher than the threshold value at time t3, the determination unit 102 instructs the control unit 103 to start the resonance protection control, based on the fact that the value W becomes equal to or higher than the threshold value. As described above, the control unit 103 may reduce the rotation speed of the motor 9 in a stepwise manner to the minimum rotation speed X (rpm), but here, another control method by using the control unit 103 will be described. When the determination unit 102 instructs the start of the resonance protection control, the control unit 103 instructs the inverter 7 to set the rotation speed of the motor 9 to the minimum rotation speed X (rpm). At time t3–1, the rotation speed of the motor 9 becomes X (rpm). When the rotation speed of the motor 9 becomes X (rpm), the determination unit 102 determines whether or not the value W of the ripple voltage is equal to or higher than the threshold value. In the illustrated example, the value W at time t3–1 is less than the threshold value. The determination unit 102 instructs the control unit 103 to cancel the resonance protection control. The control unit 103 maintains the rotation speed of the motor 9 at X (rpm) for a predetermined time Tw.
(Time t4)

When the predetermined time Tw elapses, at time t4, the control unit 103 instructs the inverter 7 to increase the rotation speed of the motor 9. As described in the example of time t2–1, the control unit 103 may indicate the rotation speed Y according to the load to the inverter 7, but here, another control method will be described. The control unit 103 increases the rotation speed of the motor 9 in a stepwise manner toward the rotation speed Y required by the load. For example, the control unit 103 indicates the rotation speed Y3 to the inverter 7. If the value W is less than the threshold value when the rotation speed of the motor 9 at time t4–1 reaches the rotation speed Y3, the control unit 103 further increases the rotation speed to Y2. After that, similarly, while the value W of the ripple voltage is less than the threshold value, the control unit 103 instructs the inverter 7 to increase in a stepwise manner the rotation speed of the motor 9. When the rotation speed Y is reached at time t5, the control unit 103 maintains the rotation speed Y of the motor 9, and the determination unit 102 determines whether or not the value W of the ripple voltage is equal to or higher than the threshold value in a predetermined control cycle. As described above, according to the present embodiment, the operation of the vehicle air conditioner 30 can be continued while avoiding the occurrence of resonance due to the ripple voltage.

Two types of control methods for reducing the rotation speed of the motor 9 are described, one is a method of reducing the rotation speed in a stepwise manner to X, and the other is a method of reducing the rotation speed to X at a time. Two types of control methods for increasing the rotation speed are described, one is a method of increasing the rotation speed in a stepwise manner to the rotation speed Y required by the load, and the other is a method of increasing the rotation speed to Y at a time. When the rotation speed is reduced in a stepwise manner to X, the time for driving the motor 9 at a high rotation speed can be lengthened, but the increase in the ripple voltage may not be reduced. On the other hand, in the case of the method of reducing the rotation speed to X at a time, the rotation speed of the motor 9 is temporarily greatly reduced, but the resonance due to the ripple voltage can be more reliably avoided. When increasing the rotation speed, if the rotation speed is increased to Y at a time, the air conditioning capacity of the vehicle air conditioner 30 can be quickly restored, but the risk that the value W of the ripple voltage increases again increases. On the other hand, in the method of increasing in a stepwise manner the rotation speed, it takes time to exhibit the required air conditioning capacity, but the motor 9 can be driven at a speed corresponding to the behavior of the ripple voltage. Any combination of control methods for reducing and increasing the number of rotation speed is used. That is, the control unit 103 may reduce in a stepwise manner the rotation speed and increase in a stepwise manner the rotation speed, or may reduce in a stepwise manner the rotation speed and increase the rotation speed to Y (rpm) at a time. Alternatively, the control unit 103 may reduce the rotation speed to X (rpm) at a time and increase in a stepwise manner the rotation speed, or may reduce the rotation speed to X (rpm) at a time and increase the rotation speed to Y (rpm) at a time. In the example of FIG. 2, the rotation speed is changed by selecting from Y1 to Y3 even in both the case of reducing and increasing the rotation speed, but the in a stepwise manner rotation speed may be set individually for each of reducing and increasing.
(Control to Stop the Motor)

In FIG. 2, an example in which an increase in the ripple voltage can be reduced by reducing the rotation speed of the motor 9 to the minimum rotation speed X (rpm) has been described. Next, with reference to FIG. 3, control when the value W of the ripple voltage cannot be controlled less than the threshold value even if the rotation speed of the motor 9 is reduced to the minimum rotation speed X (rpm) will be described.

Figure 3:
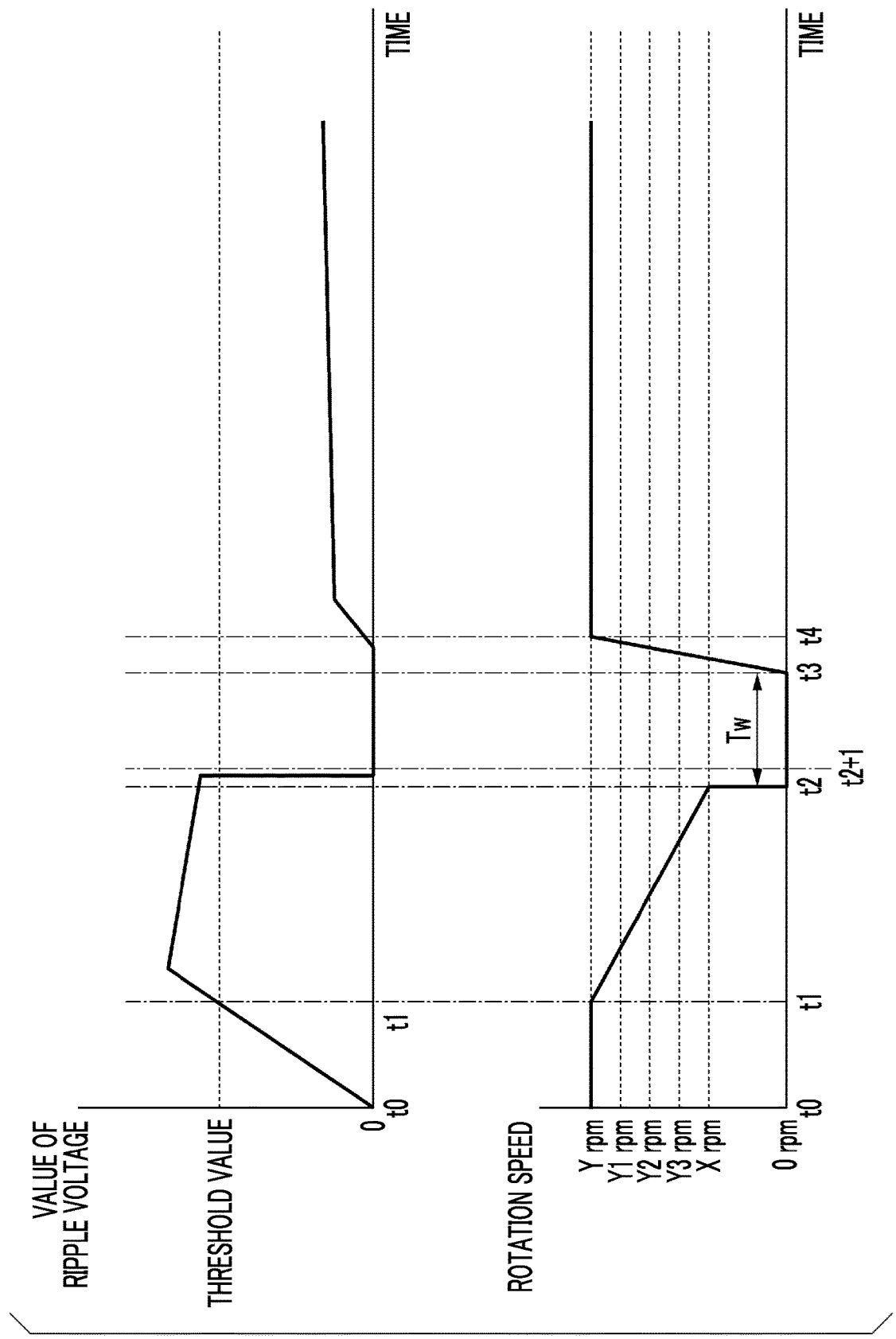
FIG. 3 is a second diagram illustrating the resonance protection control in the embodiment.

FIG. 3 is a second diagram illustrating resonance protection control in the embodiment.
(Time t1)

Similar to the description of FIG. 2, when it is detected that the value W of the ripple voltage becomes equal to or higher than the threshold value at time t1, the determination unit 102 instructs the start of the resonance protection control. The control unit 103 reduces the rotation speed of the motor 9 in a stepwise manner to Y1, Y2, and Y3. Unlike the case of the example of FIG. 2, even if the rotation speed is reduced to Y3 (rpm), the value W does not become less than the threshold value, so that the control unit 103 reduces the rotation speed of the motor 9 to the minimum rotation speed X (rpm).
(Time t2)

When the rotation speed reaches X (rpm) at time t2, the determination unit 102 determines whether or not the value W of the ripple voltage is equal to or higher than the threshold value. Since the value W at time t2 is equal to or higher than the threshold value, the determination unit 102 instructs the control unit 103 to further reduce the rotation speed. If the instruction to reduce the rotation speed is received when the current rotation speed is the minimum rotation speed X, the control unit 103 stops the motor 9. When a predetermined time elapses (time t2+1) after the motor 9 is stopped, the determination unit 102 compares the value W with the threshold value again. Since the value W becomes less than the threshold value, the determination unit 102 instructs the cancellation of the resonance protection control.

(Time t3)

When time Tw elapses after the motor 9 is stopped and time t3 is reached, the control unit 103 instructs the inverter 7 to increase the rotation speed of the motor 9. The control unit 103 indicates the rotation speed Y to the inverter 7. When the rotation speed Y is reached at time t4, the control unit 103 maintains the rotation speed Y of the motor 9 while the value W of the ripple voltage is less than the threshold value.

As described above, the control unit 103 may reduce the rotation speed of the motor 9 to the minimum rotation speed X at a time, at time t1. After time t3, the control unit 103 may in a stepwise manner increase the rotation speed of the motor 9. When the value W becomes equal to or higher than the threshold value in the process of increasing in a stepwise manner the rotation speed, the control unit 103 again reduces the rotation speed of the motor 9.

(Control to Stop the Restart of the Motor)

In FIG. 3, an example in which the value W of the ripple voltage is successfully reduced by temporarily stopping the motor 9 has been described. Next, with reference to FIG. 4, control will be described in which the value W of the ripple voltage becomes equal to or higher than the threshold value each time the motor 9 is restarted even if the motor 9 is stopped.

Figure 4:
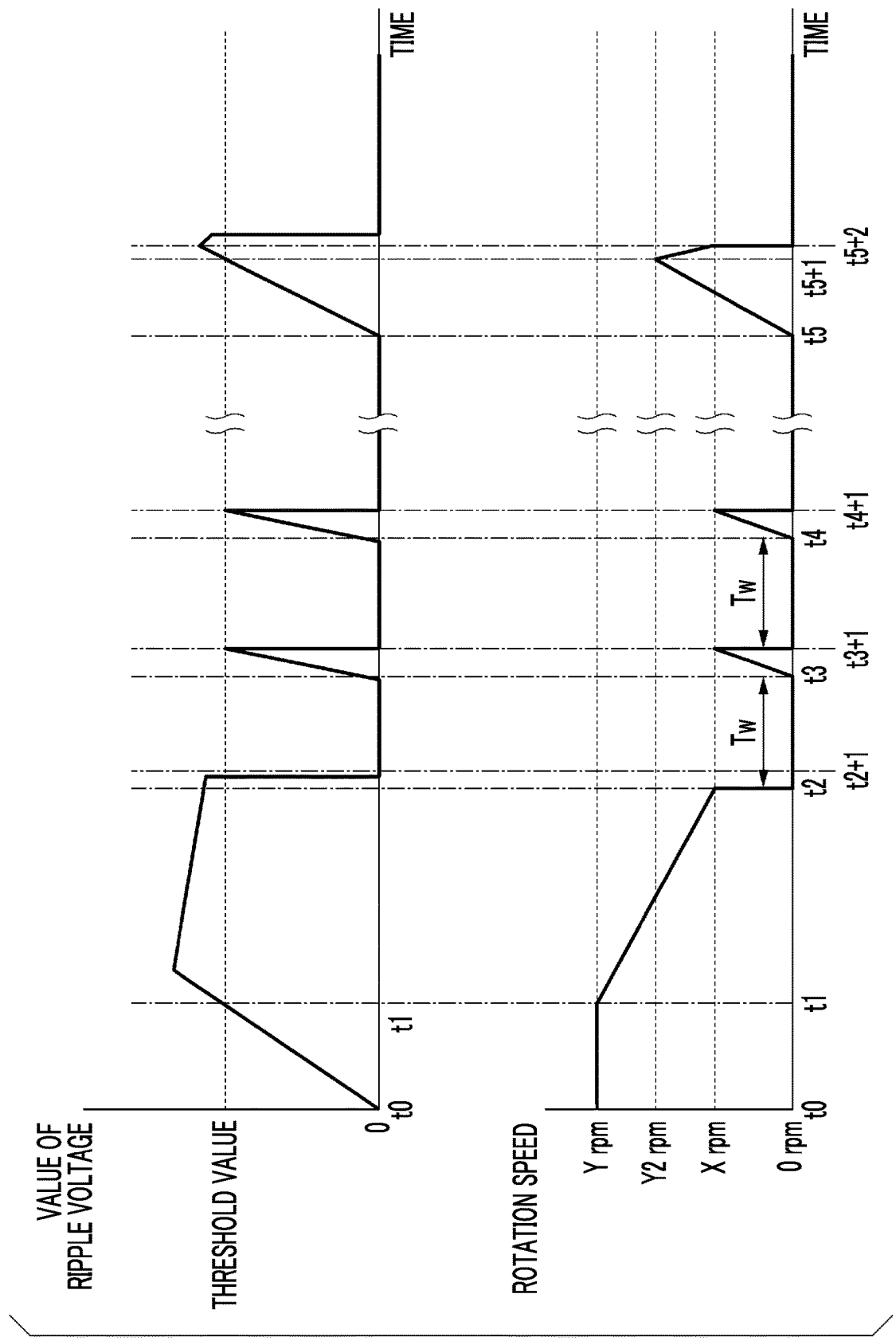
FIG. 4 is a third diagram illustrating the resonance protection control in the embodiment.

FIG. 4 is a third diagram illustrating resonance protection control in the embodiment.

(Time t1)

Similar to the description of FIG. 3, when it is detected that the value W of the ripple voltage becomes equal to or higher than the threshold value at time t1, the determination unit 102 instructs the start of the resonance protection control. The control unit 103 reduces in a stepwise manner the rotation speed of the motor 9 to Y1, Y2, Y3, and X.

(Time t2)

When the rotation speed reaches X (rpm) at time t2, the determination unit 102 determines whether or not the value W of the ripple voltage is equal to or higher than the threshold value. Since the value W of the ripple voltage at time t2 is equal to or higher than the threshold value, the control unit 103 stops the motor 9 (first stop). When a predetermined time elapses (time t2+1) after the motor 9 is stopped, the determination unit 102 compares the value W of the ripple voltage with the threshold value. Since the value W becomes less than the threshold value, the determination unit 102 instructs the cancellation of the resonance protection control. The control unit 103 indicates the target rotation speed Y to the inverter 7, after a predetermined time Tw has elapsed from the stop of the motor 9.

(Time t3, t4)

When the motor 9 is started at time t3 and the value W of the ripple voltage becomes equal to or higher than the threshold value at time t3+1, the determination unit 102 instructs the start of resonance protection control. Because the rotation speed of the motor 9 at time t3+1 is the minimum rotation speed X, the control unit 103 stops the motor 9 again (second stop). The control unit 103 executes the same process at time T4, and stops the motor 9 again at time t4+1 (third stop).

(Time t5)

After that, the start and stop of the motor 9 are repeated several times, and the control unit 103 starts the motor 9 at time t5 to increase the rotation speed. In this start-up, it is assumed that the value W of the ripple voltage does not exceed the threshold value even if the minimum rotation speed X is exceeded, and the threshold value is exceeded when the rotation speed reaches Y2 at time t5+1. Then, the determination unit 102 instructs the start of the resonance protection control, and the control unit 103 reduces the rotation speed of the motor 9 to X (rpm). Since the value W of the ripple voltage is equal to or higher than the threshold value even if the rotation speed is reduced to X (rpm), the control unit 103 stops the motor 9 (Nth stop). Here, when the number of times the start and stop of the motor 9 are repeated in succession is N times or more, the control unit 103 determines not to repeatedly start the motor 9. When the value W of the ripple voltage increases even if the start and stop of the motor 9 are repeated N times, the control device 10 temporarily stops the restart of the motor 9. At this time, the control device 10 may output an alarm. The restart stop control of the motor 9 is continued until, for example, the vehicle air conditioner 30 is temporarily stopped and the vehicle air conditioner 30 newly starts the operation next time. Thus, when the state where resonance can occur in the electric circuit illustrated in FIG. 1 continues for a long time, the electric compressor 20 can be locked to avoid a failure due to resonance.

Next, the flow of resonance protection control of the electric compressor 20 of the present embodiment will be described.

Figure 5:
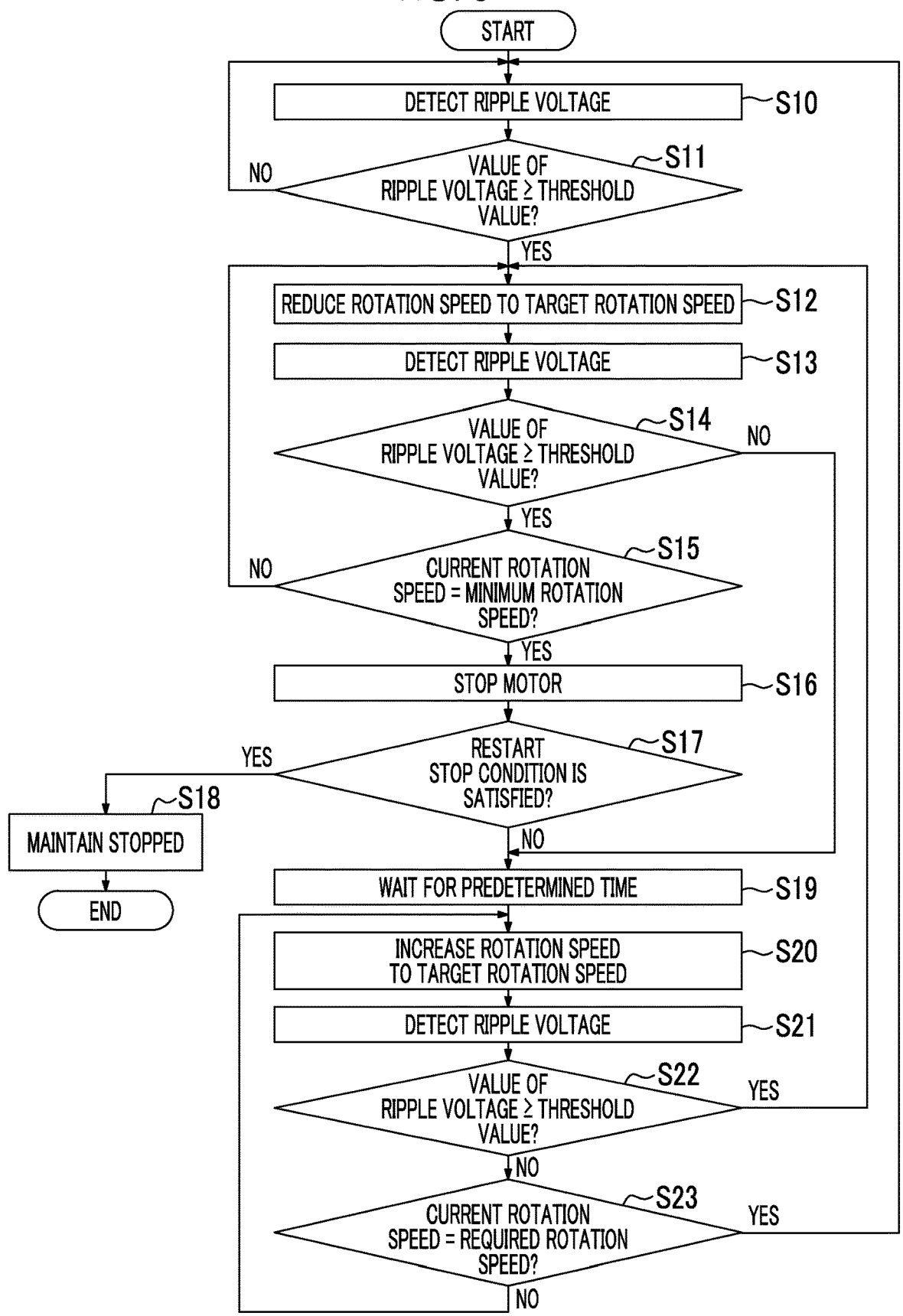
FIG. 5 is a flowchart showing an example of the resonance protection control in the embodiment.

FIG. 5 is a flowchart showing an example of resonance protection control in an embodiment.

In the electric compressor 20, the motor 9 is driven at a required rotation speed Y according to the air conditioning load of the vehicle air conditioner 30. The control device 10 performs the following process in a predetermined control cycle, while the vehicle air conditioner 30 is in operation.

First, the detection unit 101 detects the ripple voltage (step S10). Specifically, the detection unit 101 detects the value W of the ripple voltage, from the voltage value measured by the voltmeter 11 at a predetermined time. The detection unit 101 outputs the value W to the determination unit 102. The determination unit 102 determines whether or not the value W is equal to or higher than the threshold value (step S11). When the value W is less than the threshold value (step S11; No), the process from step S10 is repeated.

When the value W is equal to or higher than the threshold value (step S11; Yes), the determination unit 102 instructs the control unit 103 to start the resonance protection control. The control unit 103 reduces the rotation speed of the motor 9 to the target rotation speed (step S12). The target rotation speed may be the minimum rotation speed X (rpm), or may be rotation speeds (for example, Y1 to Y3) set in a stepwise manner between the required rotation speed Y and the minimum rotation speed X. When the rotation speed is reduced in a stepwise manner, the control unit 103 selects a value smaller than the current rotation speed and closest to the current rotation speed, and indicates the rotation speed to the inverter 7.

Next, the detection unit 101 detects the ripple voltage after the rotation speed decreases (step S13). The determination unit 102 determines whether or not the value W of the ripple voltage is equal to or higher than the threshold value (step S14). When the value W is less than the threshold value (step S14; No), the process proceeds to step S19 described later.

When the value W is equal to or higher than the threshold value (step S14; Yes), the determination unit 102 instructs the control unit 103 to reduce the rotation speed. The control unit 103 compares the current rotation speed with the minimum rotation speed X (step S15). When the current rotation speed is not equal to the minimum rotation speed X (higher than the minimum rotation speed X) (step S15; No), the process from step S12 is repeated.

When the current rotation speed is equal to the minimum rotation speed X (step S15; Yes), the control unit 103 stops the motor 9 (step S16). The control unit 103 determines whether or not the restart stop condition of the motor 9 is satisfied (step S17). For example, when the start and stop of the motor are repeated N times in succession, the control unit 103 determines that the restart stop condition of the motor 9 is satisfied. Alternatively, when the motor is repeatedly started and stopped N times within a predetermined time, the control unit 103 determines that the restart stop condition of the motor 9 is satisfied. When the restart stop condition is satisfied (step S17; Yes), the control unit 103 maintains the motor 9 stopped (step S18). The control device 10 may output an alarm notifying the abnormality of the electric compressor 20.

When the restart stop condition is not satisfied (step S17; No), the control unit 103 waits for a predetermined time Tw after the motor is stopped (step S19). When time Tw elapses, the control unit 103 starts the motor 9 and increases the rotation speed to the target rotation speed (step S20). The target rotation speed may be the required rotation speed Y, or may be rotation speeds (for example, X, Y1 to Y3) set in a stepwise manner from the minimum rotation speed X to the required rotation speed Y. When the rotation speed is increased in a stepwise manner, the control unit 103 selects a value higher than the current rotation speed and closest to the current rotation speed, and indicates the rotation speed to the inverter 7.

Next, the detection unit 101 detects the ripple voltage after the rotation speed increases (step S21). The determination unit 102 determines whether or not the value W of the ripple voltage is equal to or higher than the threshold value (step S22). When the value W is equal to or higher than the threshold value (step S22; Yes), the process from step S12 is repeated.

When the value W is less than the threshold value (step S22; No), the control unit 103 compares the current rotation speed with the required rotation speed Y (step S23). When the current rotation speed is equal to the required rotation speed Y (step S23; No), the process from step S10 is repeated.

When the current rotation speed is not equal to the required rotation speed Y (equal to or less than required rotation speed Y) (step S23; No), the process from step S20 is repeated.

According to the present embodiment, when the value W of the ripple voltage becomes equal to or higher than the threshold value, it is determined that resonance may occur in the circuit, and the rotation speed of the motor 9 of the electric compressor 20 is reduced. This makes it possible to prevent resonance that occurs in the circuit and prevent damage to the electric compressor 20 and the like. When it is determined that resonance may occur, the operation is continued without stopping the electric compressor 20, so that the air conditioning by the vehicle air conditioner 30 is continued and a decrease in user comfort can be reduced. When a predetermined time elapses after the rotation speed of the motor 9 is reduced and the value W of the ripple voltage becomes less than the threshold value, it is determined that the transient factor that increases the value W of the ripple voltage may have been removed, and the rotation speed of the motor 9 is increased again toward the required rotation speed Y required by the vehicle air conditioner 30. Thus, the operating state of the vehicle air conditioner 30 can be brought closer to the operating state according to the load, so that user comfort can be restored. When the value W of the ripple voltage becomes equal to or higher than the threshold value even if the rotation speed of the motor 9 is reduced, the motor 9 is stopped, so that the occurrence of resonance can be reliably prevented. When the value W of the ripple voltage becomes equal to or higher than the threshold value even if the stop and restart of the motor 9 are repeated several times, the motor 9 is not restarted, so that the occurrence of resonance can be reliably prevented.

Figure 6:
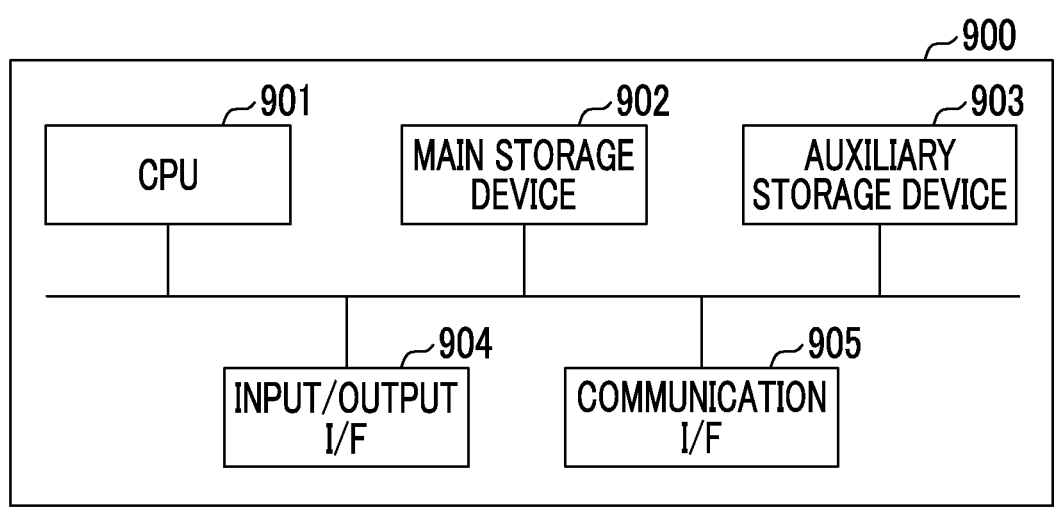
FIG. 6 is a diagram showing an example of a hardware configuration of a control device in the embodiment.

FIG. 6 is a diagram showing an example of a hardware configuration of the control device in the embodiment.

A computer 900 includes a CPU 901, a main storage device 902, an auxiliary storage device 903, an input/output interface 904, and a communication interface 905.

The control device 10 described above is mounted on the computer 900. Each of the above-described functions is stored in the auxiliary storage device 903 in the form of a program. The CPU 901 reads the program from the auxiliary storage device 903, extracts the program into the main storage device 902, and executes the above process according to the program. The CPU 901 secures a storage area in the main storage device 902 according to the program. The CPU 901 secures a storage area for storing the data being processed in the auxiliary storage device 903 according to the program.

A program for achieving all or a part of the functions of the control device 10 is recorded on a computer-readable recording medium, and the process by each functional unit may be performed by a computer system reading and executing the program recorded on the recording medium. The term "computer system" as used herein includes an OS and hardware such as peripheral devices. The "computer system" includes a homepage providing environment (or a display environment) when a WWW system is used. The "computer-readable recording medium" refers to a portable medium such as a CD, DVD, or USB, or a storage device such as a hard disk built in a computer system. When this program is delivered to the computer 900 through a communication line, the computer 900 receiving the delivered program may extract the program in the main storage device 902 and execute the above process. The above-described program may achieve a part of the above-described functions, or may further achieve the above-described functions in combination with the program already recorded in the computer system.

As described above, some embodiments according to the present disclosure have been described, but all of these embodiments are presented as examples and are not intended to limit the scope of invention. These embodiments can be implemented in various other embodiments, and various omissions, replacements, and changes can be made without departing from the gist of the invention. These embodiments and variations thereof are included in the scope of the invention described in the claims as well as in the equivalent scope and abstract of the invention.

<Additional Notes>

The control device 10, the electric compressor 20, the control method, and the program described in each embodiment are understood as follows, for example.

(1) The control device 10 according to a first aspect includes a detection unit 101 that detects a ripple voltage of an electric compressor 20 which is driven by a battery 1; a determination unit 102 that determines whether or not a value W of the ripple voltage is equal to or higher than a predetermined threshold value; and a control unit 103 that reduces a rotation speed of a motor 9 of the electric compressor 20 to a predetermined first target rotation speed (Y1 or X) higher than 0 when the value W is equal to or higher than the threshold value.

According to the control device 10, when the value of the ripple voltage reaches a predetermined threshold value W, the rotation speed of the motor 9 is reduced, so that it is possible to avoid the occurrence of resonance in the circuit for driving the electric compressor 20. Further, the motor 9 is not stopped immediately in order to avoid the occurrence of resonance, so that the operation of the electric compressor 20 can be continued.

(2) The control device 10 according to a second aspect is the control device 10 in (1), in which the first target rotation speeds Y1 to Y4 are one of predetermined rotation speeds determined in a stepwise manner from a current rotation speed Y to a predetermined minimum rotation speed X.

By reducing in a stepwise manner the rotation speed, the rotation speed of the motor 9 can be maintained as high as possible.

(3) The control device 10 according to a third aspect is the control device 10 in (1) and (2), in which the first target rotation speed is a predetermined minimum rotation speed X.

By reducing the rotation speed of the motor 9 to the minimum rotation speed X at a time, the operation of the electric compressor 20 can be continued while avoiding resonance more reliably.

(4) The control device 10 according to a fourth aspect is the control device 10 in (2) and (3), in which when the rotation speed of the motor 9 is reduced to the first target rotation speed (X, Y1 to Y4), the determination unit 102 determines whether or not the value W is equal to or higher than a predetermined threshold value, and in a case where the value W is equal to or higher than the threshold value, when the first target rotation speed (X, Y1 to Y4) is the minimum rotation speed X, the control unit 103 stops the motor 9, and when the first target rotation speed is higher than the minimum rotation speed X, the control unit 103 further reduces the rotation speed of the motor 9 to a predetermined second target rotation speed (Y2 to Y4).

When the value W of the ripple voltage is equal to or higher than the threshold value even if the rotation speed of the motor 9 is reduced to the first target rotation speed, the rotation speed of the motor 9 is further reduced, so that the occurrence of resonance can be prevented.

(5) The control device 10 according to a fifth aspect is the control device 10 in (2) and (3), in which when the rotation speed of the motor 9 is reduced to the first target rotation speed, the determination unit 102 determines whether or not the value W is equal to or higher than a predetermined threshold value, and when the magnitude of the value W is less than the threshold value, the control unit 103 increases the rotation speed of the motor 9 toward a required rotation speed Y required by a load.

When the value W of the ripple voltage is reduced below the threshold value after reducing the rotation speed of the motor 9, the transient factor that increases the value W of the ripple voltage may have been removed, so that the rotation speed is increased again. Thus, the electric compressor 20 can be operated in a state close to the demand.

(6) The control device 10 according to a sixth aspect is the control device 10 in (5), in which the control unit 103 increases in a stepwise manner the rotation speed of the motor 9 to the required rotation speed Y.

By increasing in a stepwise manner the rotation speed of the motor 9, the rotation speed of the motor 9 can be brought close to the required rotation speed Y.

(7) The control device 10 according to a fifth aspect is the control device 10 in (5) and (6), in which when the value W becomes equal to or higher than the threshold value a predetermined number of times or more, after the motor 9 is stopped and the motor 9 is started again, the control unit 103 maintains the motor 9 stopped.

When an increase in the ripple voltage occurs even if the motor 9 is repeatedly restarted, the occurrence of resonance can be avoided by maintaining the motor 9 stopped.

(8) The electric compressor 20 according to an eighth aspect includes the control device in (1) to (7).

(9) The control method according to a ninth aspect includes detecting a ripple voltage of an electric compressor which is driven by a battery; determining whether or not a value W of the ripple voltage is equal to or higher than a predetermined threshold value; and reducing a rotation speed of a motor of the electric compressor to a predetermined first target rotation speed higher than 0, when the value W is equal to or higher than the threshold value.

(10) The program according to a tenth aspect causes a computer to function as: means for detecting a ripple voltage of an electric compressor which is driven by a battery; means for determining whether or not a value W of the ripple voltage is equal to or higher than a predetermined threshold value; and means for reducing the rotation speed of the motor of the electric compressor to a predetermined first target rotation speed larger than 0 when the value W is equal to or higher than the threshold value.

INDUSTRIAL APPLICABILITY

According to the above-described control device, electric compressor, control method, and program, the operation of the electric compressor can be continued while avoiding resonance due to ripple.

REFERENCE SIGNS LIST

1 Battery
2 Capacitor
3 Inverter
4 Load
5a, 5b Inductor
6 Capacitor
7 Inverter
8 Power supply circuit
9 Motor
10 Control device
101 Detection unit
102 Determination unit
103 Control unit
11 Voltmeter
12 Compression unit
30 Vehicle air conditioner
20 Electric compressor
40 Vehicle equipment
900 Computer
901 CPU
902 Main storage device
903 Auxiliary storage device
904 Input/output interface
905 Communication interface

The invention claimed is:
1. A control device comprising:
a detection unit that detects a ripple voltage of an electric compressor, which is driven by a battery;
a determination unit that determines whether or not a value of the ripple voltage is equal to or higher than a predetermined threshold value; and a control unit that reduces a rotation speed of a motor of the electric compressor to a predetermined first target rotation speed higher than 0 when the value of the ripple voltage is equal to or higher than the predetermined threshold value, wherein, when the rotation speed of the motor is reduced to the predetermined first target rotation speed, the determination unit determines whether or not the value of the ripple voltage is equal to or higher than the predetermined threshold value, and in a case where the value of the ripple voltage is equal to or higher than the predetermined threshold value, the control unit stops the motor when the first target rotation speed is a predetermined minimum rotation speed, and the control unit further reduces the rotation speed of the motor to a predetermined second target rotation speed when the predetermined first target rotation speed is higher than the predetermined minimum rotation speed.

2. The control device according to claim 1, wherein the predetermined first target rotation speed is one of predetermined rotation speeds determined in a stepwise manner from a current rotation speed to the predetermined minimum rotation speed.

3. The control device according to claim 1, wherein the predetermined first target rotation speed is the predetermined minimum rotation speed.

4. A control device comprising:
a detection unit that detects a ripple voltage of an electric compressor, which is driven by a battery;
a determination unit that determines whether or not a value of the ripple voltage is equal to or higher than a predetermined threshold value; and
a control unit that reduces a rotation speed of a motor of the electric compressor to a predetermined first target rotation speed higher than 0 when the value of the ripple voltage is equal to or higher than the predetermined threshold value, wherein, when the rotation speed of the motor is reduced to the predetermined first target rotation speed, the determination unit determines whether or not the value of the ripple voltage is equal to or higher than the predetermined threshold value, and when the value of the ripple voltage is less than the predetermined threshold value, the control unit increases the rotation speed of the motor toward a required rotation speed required by a load.

5. The control device according to claim 4, wherein the control unit increases the rotation speed of the motor to the required rotation speed in a stepwise manner.

6. The control device according to claim 4, wherein when the value of the ripple voltage becomes equal to or higher than the predetermined threshold value a predetermined number of times or more, after the motor is stopped and the motor is started again, the control unit maintains the motor stopped.

7. An electric compressor comprising:
a control device comprising:
a detection unit that detects a ripple voltage of an electric compressor, which is driven by a battery;
a determination unit that determines whether or not a value of the ripple voltage is equal to or higher than a predetermined threshold value; and
a control unit that reduces a rotation speed of a motor of the electric compressor to a predetermined first target rotation speed higher than 0 when the value of the ripple voltage is equal to or higher than the predetermined threshold value, wherein, when the rotation speed of the motor is reduced to the predetermined first target rotation speed, the determination unit determines whether or not the value of the ripple voltage is equal to or higher than the predetermined threshold value, and in a case where the value of the ripple voltage is equal to or higher than the predetermined threshold value, the control unit stops the motor when the first target rotation speed is a predetermined minimum rotation speed, and the control unit further reduces the rotation speed of the motor to a predetermined second target rotation speed when the predetermined first target rotation speed is higher than the predetermined minimum rotation speed.

8. A control method comprising:
detecting a ripple voltage of an electric compressor, which is driven by a battery;
determining whether or not a value of the ripple voltage is equal to or higher than a predetermined threshold value;
reducing a rotation speed of a motor of the electric compressor to a predetermined first target rotation speed higher than 0 when the value of the ripple voltage is equal to or higher than the predetermined threshold value;
when the rotation speed of the motor is reduced to the predetermined first target rotation speed, determining whether or not the value of the ripple voltage is equal to or higher than the predetermined threshold value, and in a case where the value of the ripple voltage is equal to or higher than the predetermined threshold value, stopping the motor when the first target rotation speed is a predetermined minimum rotation speed, and further reducing the rotation speed of the motor to a predetermined second target rotation speed when the predetermined first target rotation speed is higher than the predetermined minimum rotation speed.

9. A non-transitory computer-readable storage media storing a program causing a computer to function as:
means for detecting a ripple voltage of an electric compressor, which is driven by a battery;
means for determining whether or not a value of the ripple voltage is equal to or higher than a predetermined threshold value;
means for reducing a rotation speed of a motor of the electric compressor to a predetermined first target rotation speed higher than 0 when the value of the ripple voltage is equal to or higher than the predetermined threshold value;
when the rotation speed of the motor is reduced to the predetermined first target rotation speed, means for determining whether or not the value of the ripple voltage is equal to or higher than the predetermined threshold value, and in a case where the value of the ripple voltage is equal to or higher than the predetermined threshold value, means for stopping the motor when the first target rotation speed is a predetermined minimum rotation speed, and further reducing the rotation speed of the motor to a predetermined second target rotation speed when the predetermined first target rotation speed is higher than the predetermined minimum rotation speed.

10. An electric compressor comprising:
a control device comprising:
- a detection unit that detects a ripple voltage of an electric compressor, which is driven by a battery;
- a determination unit that determines whether or not a value of the ripple voltage is equal to or higher than a predetermined threshold value; and
- a control unit that reduces a rotation speed of a motor of the electric compressor to a predetermined first target rotation speed higher than 0 when the value of the ripple voltage is equal to or higher than the predetermined threshold value, wherein, when the rotation speed of the motor is reduced to the predetermined first target rotation speed, the determination unit determines whether or not the value of the ripple voltage is equal to or higher than the predetermined threshold value, and when the value of the ripple voltage is less than the predetermined threshold value, the control unit increases the rotation speed of the motor toward a required rotation speed required by a load.

11. A control method comprising:
detecting a ripple voltage of an electric compressor, which is driven by a battery;
determining whether or not a value of the ripple voltage is equal to or higher than a predetermined threshold value;
reducing a rotation speed of a motor of the electric compressor to a predetermined first target rotation speed higher than 0 when the value of the ripple voltage is equal to or higher than the predetermined threshold value;

when the rotation speed of the motor is reduced to the predetermined first target rotation speed, determining whether or not the value of the ripple voltage is equal to or higher than the predetermined threshold value, and when the value of the ripple voltage is less than the predetermined threshold value, increasing the rotation speed of the motor toward a required rotation speed required by a load.

12. A non-transitory computer-readable storage media storing a program causing a computer to function as:
- means for detecting a ripple voltage of an electric compressor, which is driven by a battery;
- means for determining whether or not a value of the ripple voltage is equal to or higher than a predetermined threshold value;
- means for reducing a rotation speed of a motor of the electric compressor to a predetermined first target rotation speed higher than 0 when the value of the ripple voltage is equal to or higher than the predetermined threshold value;

when the rotation speed of the motor is reduced to the predetermined first target rotation speed, means for determining whether or not the value of the ripple voltage is equal to or higher than the predetermined threshold value, and when the value of the ripple voltage is less than the predetermined threshold value, means for increasing the rotation speed of the motor toward a required rotation speed required by a load.

* * * * *